J. ROBINSON.
SPRING SUSPENSION FOR VEHICLES.
APPLICATION FILED MAR. 27, 1917.
1,234,490.
Patented July 24, 1917.
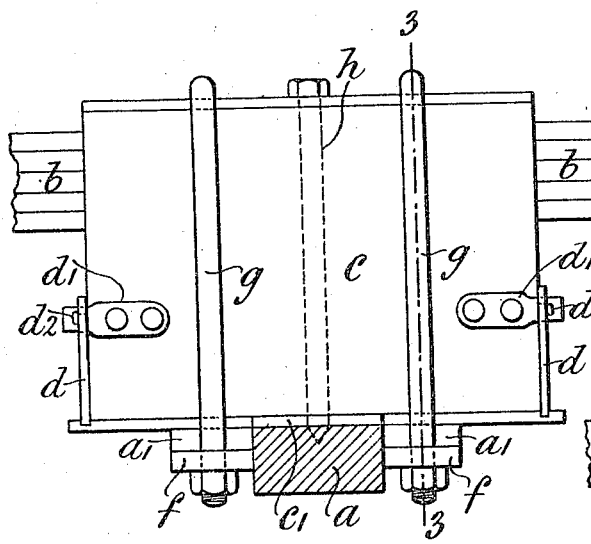
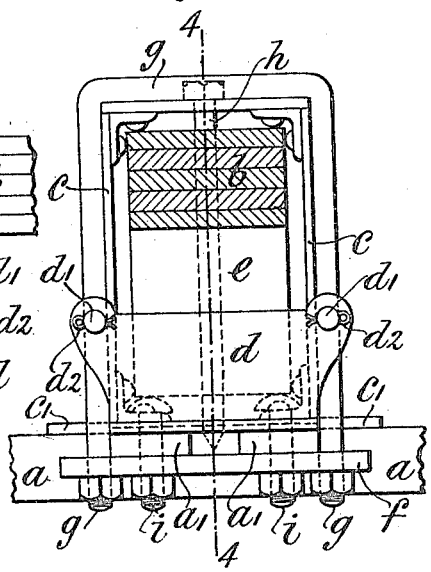
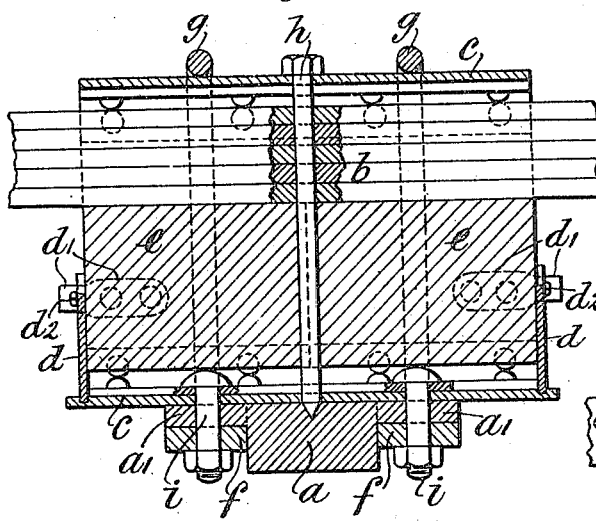
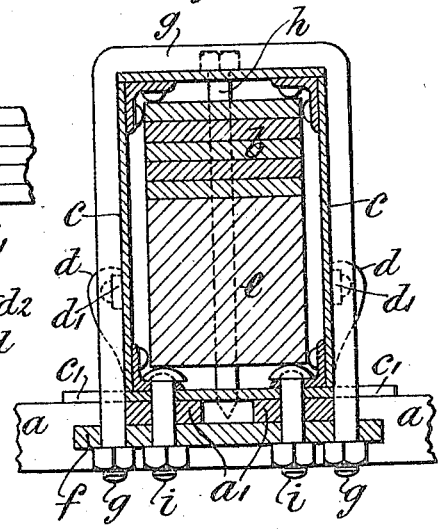
Witness:
P. J. Gathmann
Inventor:
James Robinson
By his Attorneys
Baldwin & Wight

UNITED STATES PATENT OFFICE.

JAMES ROBINSON, OF BARNHAM, ENGLAND.

SPRING SUSPENSION FOR VEHICLES.

1,234,490.      Specification of Letters Patent.      Patented July 24, 1917.

Application filed March 27, 1917. Serial No. 157,679.

*To all whom it may concern:*

Be it known that I, JAMES ROBINSON, a subject of the King of Great Britain, residing at The Deodars, Barnham, in the county of Sussex, England, have invented a new and useful Improvement in Spring Suspensions for Vehicles, of which the following is a specification.

According to this invention the usual spring on which the body of a road vehicle is supported passes through a box comprising two rigid sides for preventing lateral play of the spring which bears against a spring within the box, and an immovable top and bottom. The bottom of the box is bolted or welded to the axle.

The invention is illustrated by the accompanying drawings, in which Figure 1 is a front elevation and Fig. 2 is an end elevation of a spring suspension.

Figs. 3 and 4 are sections respectively on the lines 3—3 of Fig. 1 and 4—4 of Fig. 2.

$a$ is the axle of the vehicle provided with side extensions $a^1$, and $b$ is one of the springs on which the body of the vehicle is supported. $c$ is a box having its top, bottom and two sides inseparably formed, the two ends of the box being formed to allow the passage and play of the spring $b$.

Plates $d$, which are adapted to close the lower portion of the box at its ends, are made easily removable to allow the insertion of rubber blocks $e$ beneath the spring $b$. These plates are each provided with holes through which projections $d^1$ fixed to the box are extended secured by split pins $d^2$ passing through the projections. The bottom of the box $c$ is bolted to the axle $a$ by bolts $i$.

To insure firm seating of the box on the axle its bottom is provided with side extensions $c^1$. Plates $f$ through which the bolts $i$ pass are provided with holes for the passage of the ends of straps $g$ passing over the box and made fast by nuts.

$h$ is the axle pin which passes through the top and bottom of the box $c$ between the blocks $e$ apertured for this purpose, and through the spring $b$.

In place of rubber blocks as illustrated, inflated pads or balls or helical metal springs may be employed.

The vehicle spring may be located below the axle in which case the box is bolted to the bottom of the axle.

What I claim is:—

1. In a spring suspension for vehicles, the combination of an axle, a box bolted to the axle, said box comprising a top, bottom and sides permanently secured together, said sides being adapted to prevent lateral play of the vehicle spring, spring means within said box, and a vehicle spring passing through said box and bearing upon said spring means.

2. In a spring suspension for vehicles, the combination of an axle, a box bolted to the axle, said box comprising a top, bottom, sides and removable end pieces, said top, bottom and sides being permanently secured together, and said sides being adapted to prevent lateral play of the vehicle spring, spring means within said box, and a vehicle spring passing through said box and bearing upon said spring means.

In testimony that I claim the foregoing as my invention, I have signed my name this 26 day of February, 1917.

JAMES ROBINSON.

Copies of this patent may be obtained for five cents each, by addressing the "Commissioner of Patents, Washington, D. C."